US007366577B2

(12) United States Patent
DiSanza et al.

(10) Patent No.: US 7,366,577 B2
(45) Date of Patent: Apr. 29, 2008

(54) PROGRAMMABLE ANALOG INPUT/OUTPUT INTEGRATED CIRCUIT SYSTEM

(75) Inventors: Leonard J DiSanza, Austin, TX (US); David T. Roach, Austin, TX (US); Roy L. Vargas, Austin, TX (US); Daniel T Bogard, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1015 days.

(21) Appl. No.: 10/351,797

(22) Filed: Jan. 27, 2003

(65) Prior Publication Data

US 2004/0122541 A1 Jun. 24, 2004

Related U.S. Application Data

(60) Provisional application No. 60/434,908, filed on Dec. 19, 2002.

(51) Int. Cl.
*G06F 17/00* (2006.01)

(52) U.S. Cl. ............................ 700/94; 381/58; 381/59; 381/123

(58) Field of Classification Search .................. 700/94; 381/58, 59, 74, 81, 85, 332, 91, 123; 324/723, 324/725; 710/31
See application file for complete search history.

(56) References Cited

U.S. PATENT DOCUMENTS

| | | | | |
|---|---|---|---|---|
| 6,259,957 | B1 * | 7/2001 | Alexander et al. | 700/94 |
| 6,509,758 | B2 * | 1/2003 | Piasecki et al. | 326/37 |
| 2003/0122549 | A1 * | 7/2003 | Chiozzi et al. | 324/525 |
| 2004/0081099 | A1 * | 4/2004 | Patterson et al. | 370/241 |

OTHER PUBLICATIONS

U.S. Appl. No. 60/391,119 (Patterson et al.) specification. Filed Jun. 24, 2002. Available through Public PAIR. 27 pages.*

* cited by examiner

*Primary Examiner*—Sinh Tran
*Assistant Examiner*—Walter F Briney, III
(74) *Attorney, Agent, or Firm*—Garlick Harrison & Markison; Timothy W. Markison

(57) ABSTRACT

The programmable analog input/output integrated circuit system includes a plurality of integrated circuit pins, an analog input/output circuit, a control module, and a switching module. The analog input/output circuit is coupled to the plurality of pins and determines the input/output status of each of the pins. The control module generates an I/O control signal and a switching control signal based on the input/output status of the integrated circuit pins. The I/O control signal is provided to the analog I/O circuit, which configures itself as an input or output based on the I/O control signal. The control module provides the switching control signal to the switching module, which configures itself to couple the analog input and/or analog output to corresponding functional circuitry of the corresponding integrated circuit.

25 Claims, 7 Drawing Sheets programmable I/O IC system 14 integrated circuit 10 programmable I/O IC system 14

I/O module 40 load impedance module 62 control logic functionality load impedance module 62 load impedance module 62 audio codec IC 100

PROGRAMMABLE ANALOG INPUT/OUTPUT INTEGRATED CIRCUIT SYSTEM

This patent application is claiming priority under 35 USC § 119(e) to provisional patent application entitled PROGRAMMABLE ANALOG INPUT/OUTPUT INTEGRATED CIRCUIT SYSTEM, having a provisional patent application No. of 60/434,908, and a provisional filing date of Dec. 19, 2002.

BACKGROUND OF THE INVENTION

1. Technical Field of the Invention

This invention relates generally to integrated circuits and more particularly to flexible connectivity to such integrated circuits.

2. Description of Related Art

As is known, an audio codec (coder/decoder) is used in almost all equipment that includes an audio component (e.g., CD players, dictaphones, personal computers, laptops, DVD players, et cetera). In general, an audio codec is implemented as an integrated circuit and includes a digital interface, analog-to-digital converters, digital-to-analog converters, and an analog mixing circuitry. The digital interface provides to, and receives digitized audio signals from, a digital processing circuitry of the corresponding equipment. The digitized audio signals received via the digital interface are converted into analog signals via the digital-to-analog converters. The analog mixing circuitry may mix the converted analog signals with other analog signals or pass them unmixed to one of the outputs of the audio codec. Such outputs include a headphone driver output and a line-level output.

An audio codec may receive analog audio signals from external sources via a microphone input or line-in input. The analog-to-digital converters convert the received analog audio signals into digitized audio signals, which are then provided to the digital interface. In addition to, or in the alternative, the received analog audio signals may be provided to the analog mixing circuitry for passing to an output of the audio codec and/or for mixing with other analog signals, where the mixed analog signals are provided to one of the audio codec outputs.

Typically, the equipment incorporating an audio codec includes jacks for coupling external output devices (e.g., headphones, line-out) to the analog outputs of the audio codec and for coupling external input devices (e.g., line-in, microphone) to the inputs of the audio codec. Further, the jacks are usually colored coded and/or labeled to indicate their particular function. Despite such labeling and/or color-coding, some customers incorrectly couple external input devices (e.g., microphones) and/or external output devices (e.g., headphones, cable to a receiver) to the equipment, which then does not operate properly. Often, the customer will call the technical support group of the manufacturer for assistance. Supporting this type of service call is expensive, in time and personnel, to the manufacturer.

In addition to avoiding such service calls, many manufacturers desire design flexibility when developing equipment that includes an audio component. Current audio codec integrated circuits do not offer such flexibility in that the pin-out of the integrated circuits is fixed.

Therefore, a need exists for a method and apparatus for programmable analog input/output pins of an integrated circuit.

BRIEF SUMMARY OF THE INVENTION

The programmable analog input/output integrated circuit system of the present invention substantially meets these needs and others. In one embodiment, the programmable analog input/output integrated circuit system includes a plurality of integrated circuit pins, an analog input/output circuit, a control module, and a switching module. The analog input/output (I/O) circuit is coupled to the plurality of pins and determines the input/output status of each of the pins. For example, the analog I/O circuit determines impedance of a load coupled to a jack of the equipment, which in turn is coupled to one of the integrated circuit pins. The control module then determines, based on the impedance, the type of load coupled to the pin (i.e., whether the load corresponds to an input device or an output device). The control may also determine the type of input device and/or output device to provide further connectivity flexibility. In addition, the control module generates an I/O control signal and a switching control signal based on the input/output status of the integrated circuit pins. The I/O control signal is provided to the analog I/O circuit, which configures itself as an input or output based on the I/O control signal. The control module provides the switching control signal to the switching module, which configures itself to couple the analog input and/or analog output to corresponding functional circuitry of the corresponding integrated circuit. As such, integrated circuits incorporating the programmable analog input/output integrated circuit system have significant flexibility with respect to incorrect coupling of external devices to the integrated circuit via input/output ports of the equipment incorporating the integrated circuit, and provide manufacturers flexibility in developing equipment with respect to connectivity to the integrated circuit.

DETAILED DESCRIPTION OF THE INVENTION

Figure 1:
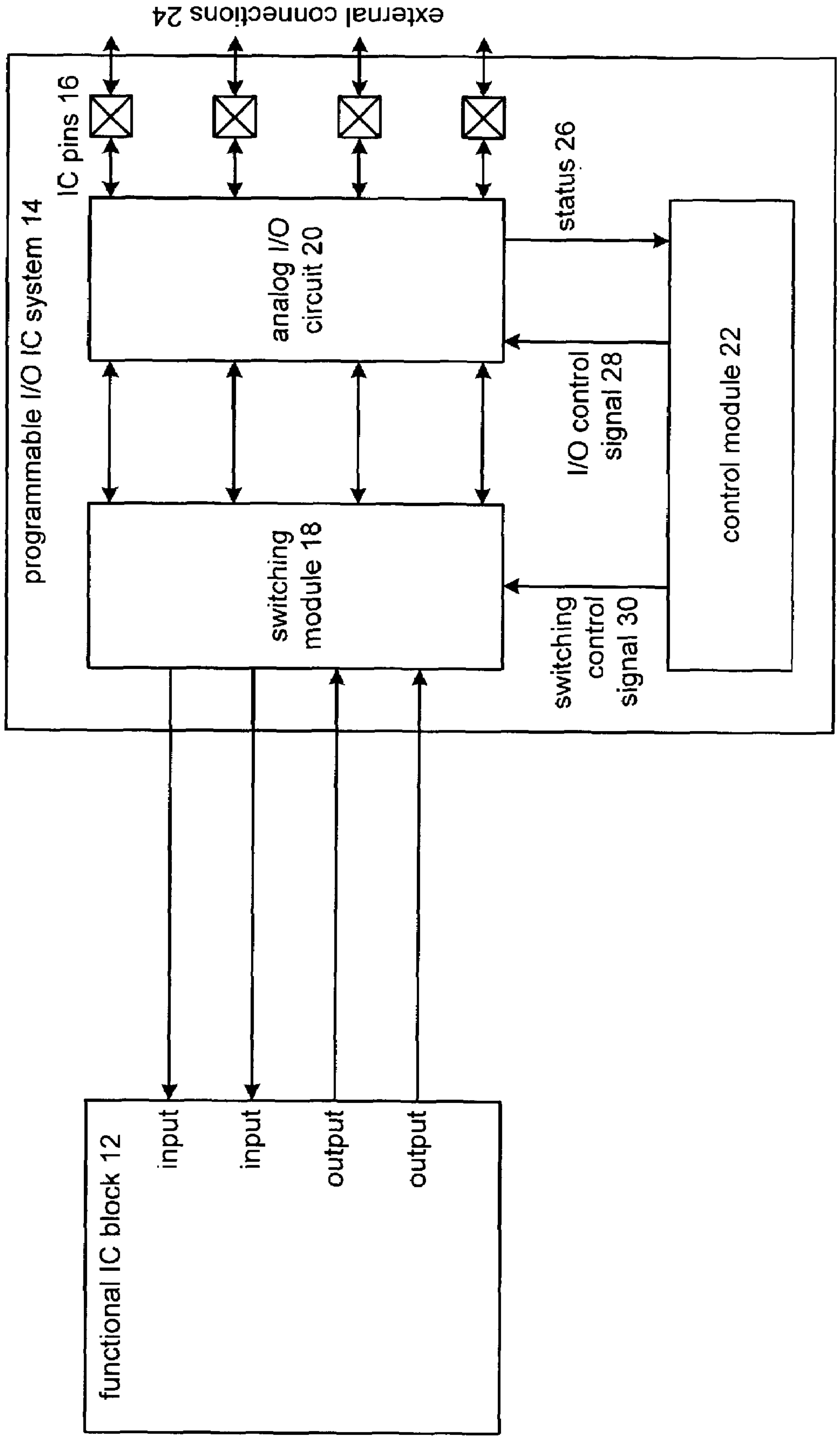
FIG. 1 is a schematic block diagram of an integrated circuit in accordance with the present invention.

FIG. 1 is a schematic block diagram of an integrated circuit 10 that includes a functional integrated circuit block 12 and a programmable input/output (I/O) integrated circuit (IC) system 14. The integrated circuit 10 may be of any construct that receives analog input signals and/or provides analog output signals. For example, the integrated circuit 10 may process audio signals, video signals, a combination thereof, et cetera. Accordingly, the functional integrated circuit block 12 may perform a wide variety of functions including processing digitized audio signals, processing digitized video signals et cetera. As shown, the functional integrated circuit block 12 includes a plurality of analog inputs and a plurality of analog outputs. As one of average skill in the art will appreciate, the functional integrated circuit block 12 may include more or less analog inputs and analog outputs than illustrated in FIG. 1.

The programmable I/O IC system 14 includes a plurality of integrated circuit pins 16, a switching module 18, an analog I/O circuit 20, and a control module 22. The plurality of integrated circuit pins 16 provides coupling to external connections 24. As shown, the IC pins 16 may function as analog input pins and/or analog output pins. The analog I/O circuit 20 is operably coupled to the IC pins 16 and senses the external connection 24 thereto and provides status information 26 (e.g., the impedance of a load coupled thereto, an identifying code, or other recognition means) to the control module 22. The analog I/O circuit 20 provides status information 26 for each of the integrated circuit pins 16.

The control module 22 interprets the status information 26 for each of the integrated circuit pins 16. Based on the status 26, the control module 22 generates an I/O control signal 28 for each of the integrated circuit pins 16. The analog I/O circuit 20 receives the I/O control signal 28 for each of the pins 16 and configures itself to function as an analog input or analog output. For example, one of the IC pins 16 may have a microphone coupled thereto. The analog I/O circuit 20 senses the impedance of the device and provides the impedance as status 26 to the control module 22. The control module 22 interprets the impedance to determine that the device coupled to this particular pin is a microphone. Based on this determination, the control module 22 generates an I/O control signal 26 such that the analog I/O circuit 20 configures itself as an analog input for this particular pin.

The control module 22 also generates a switching control signal 30 for each of the pins based on the status 26. The switching module 18 receives the switching control signal 30 and configures itself to provide the selected integrated circuit pin to a particular input or output of the functional IC block 12.

Figure 2:
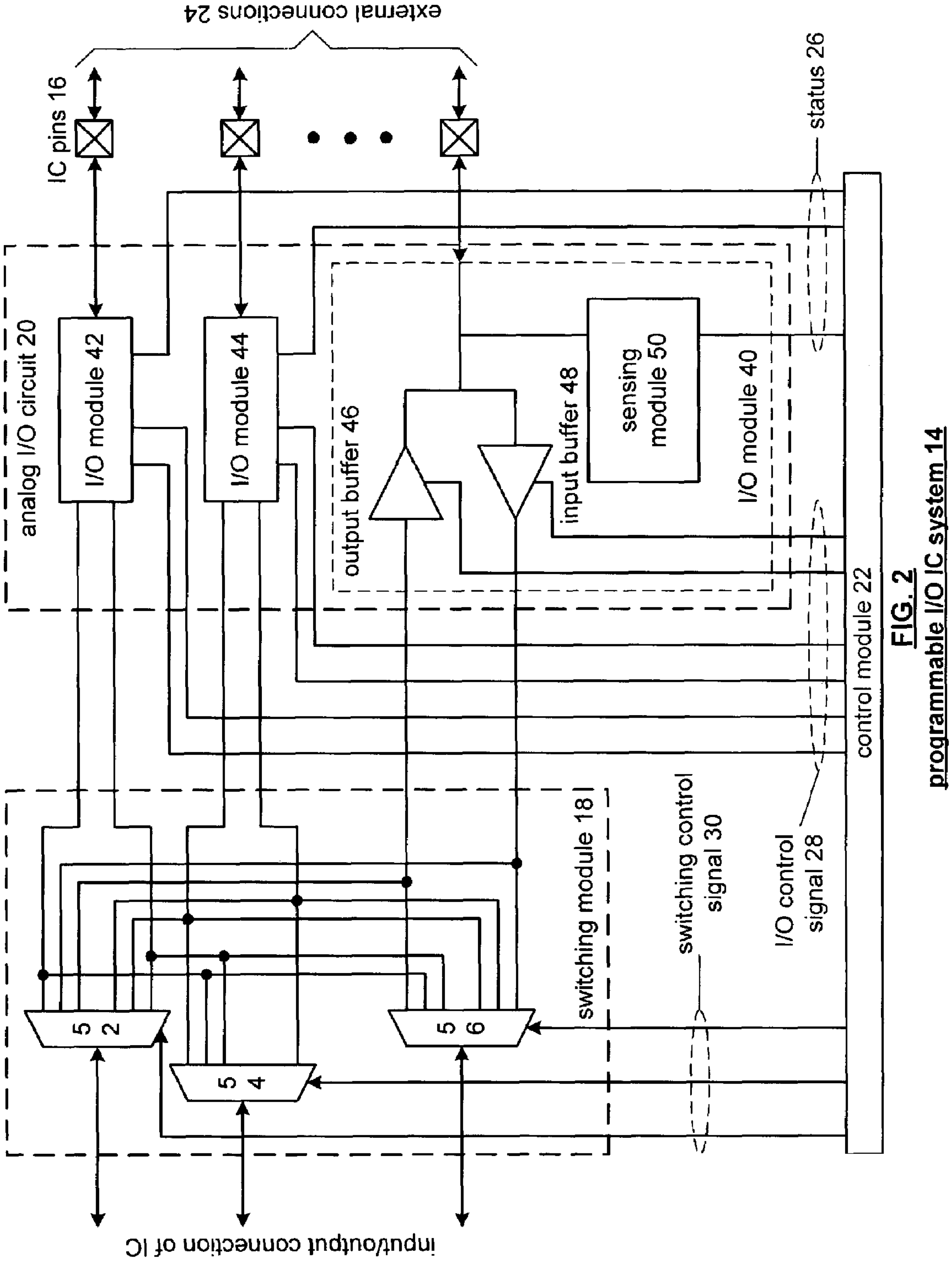
FIG. 2 is a schematic block diagram of a programmable input/output integrated circuit system in accordance with the present invention.

FIG. 2 is a schematic block diagram of the programmable I/O IC system 14. The system 14 includes the analog I/O circuit 20, the switching module 18, the plurality of integrated circuit pin 16 and the control module 22. The analog I/O circuit 20 includes a plurality of I/O modules 40-44. The switching module 18 includes a plurality of multiplexers 52-56. The number of I/O modules 40-42 corresponds to the number of integrated circuit pin 16. As one of average skill in the art will appreciate, the programmable I/O IC system 14 may include one or a plurality of integrated circuit pins depending on the desired functionality of the integrated circuit.

The I/O module 40-44 includes at least one tri-stated output buffer 46, at least one input buffer 48, which may be a tri-state device or may be effectively incorporated in an input node of the functional circuitry when impedance of the input pin substantially matches the impedance of the input node of the functional circuitry, and a sensing module 50. In operation, prior to configuration, the sensing module 50 senses the impedance on the corresponding integrated circuit pin. The impedance of the load on the integrated circuit pin is provided to the control module 22 as status information 26. The control module 22, based on a look-up table or other type of impedance determining algorithm, identifies the particular load on the particular pin. Based on the particular type of load (e.g., microphone, headphone, line-out connection, line-in connection, et cetera) the control module 22 generates an I/O control signal 28 for the particular I/O module 40-44. The I/O control signal 28 places the input buffer 48, if one is included, or the output buffer 46 in a high impedance state and the other in an active state. For example, if a microphone is coupled to the corresponding pin, the I/O control signal 28 places the output buffer 46 in a high impedance state and the input buffer 48 is activated. As an alternative example, if the load coupled to the pin is a headphone, the control module 22 generates the I/O control signal 28 to place the input buffer 48 in a high impedance state and the output buffer 46 in the active state. These examples may be implemented based on user input or automated one a system level.

The control module 22 also generates the switching control signals 30, which cause the switching module 18 to provide a connective input or output path between at least one of the pins and the functional integrated circuit block 12. In this illustration, the switching module 18 includes three bi-directional multiplexers 52-56. As one of average skill in the art will appreciate, the switching module 18 may include more or less multiplexers depending on the desired cross connection of the integrated circuit pins to the functional integrated circuit block or may use switches, transistors, etc. in place of or combination with the multiplexers.

In this illustration, each multiplexer 52-56 is coupled to the output buffer and/or the input buffer of each I/O module 40-44. (Note that each multiplexer 52-56 may include at least one input multiplexer and at least one output multiplexer, or each multiplexer 52-56 may be a bidirectional multiplexer.) Accordingly, based on the switching control signal 30, each multiplexer may pass an analog input signal or analog output signal to any one of the integrated circuit pins. Accordingly, significant flexibility is provided to manufacturers of integrated circuits that include a programmable I/O IC system 14. In addition, by sensing the load placed on the IC pin 16 as part of configuring the analog I/O circuit, a misconnection by a user of equipment may be automatically corrected by the programmable I/O IC system 14, thus avoiding costly service calls.

Figure 3:
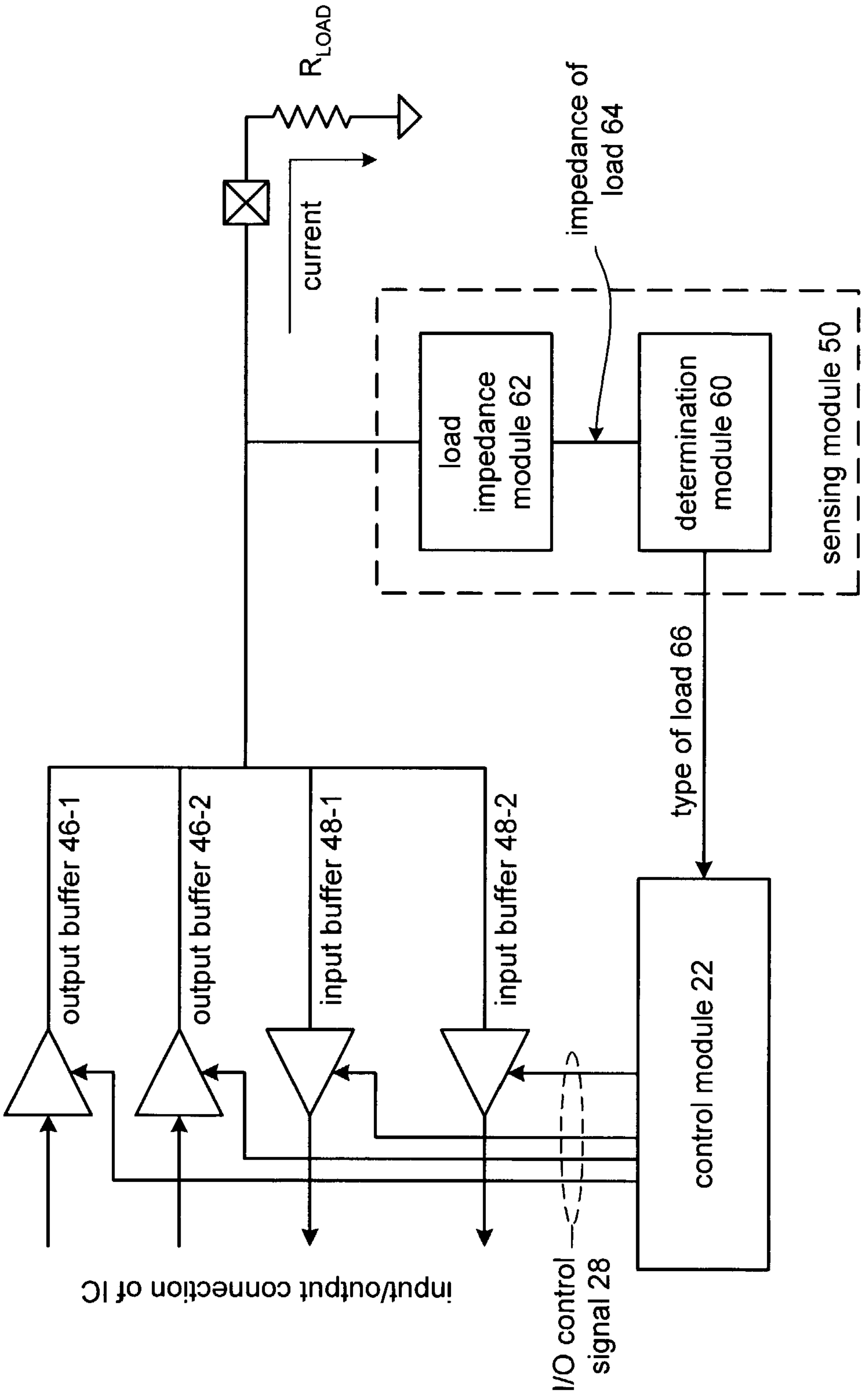
FIG. 3 is a schematic block diagram of an input/output module in accordance with the present invention.

FIG. 3 is a schematic block diagram of an I/O module 40-44. In this illustration, the I/O module 40 includes the sensing module 50, and a plurality of input buffers 48-1 and 48-2 and a plurality of output buffers 46-1 and 46-2. The I/O module 40 is coupled to the control module 22, which is shown for convenience. The sensing module 50 includes a load impedance module 62 and a determination module 60. Note that the determination module 60 may be part of control module 22 and/or may be part of the processing device within the integrated circuit.

In operation, the load impedance module 62 senses the voltage and current associated with the load ($R_{load}$) coupled to the corresponding integrated circuit pin. The load may be a microphone, headphone, speakers, line input jack, line output jack, et cetera. With the current flowing through the load, the load impedance module 62 determines the impedance of the load 64.

The determination module 60 receives the impedance of the load 64 and determines the particular type of load 66. Note that depending on configuration of the determination module 60, the impedance of the load 64 or the type of load 66 may correspond to the status information 26 of the preceding figures. The functionality of the determination module 60 and load impedance module 62 will be described in greater detail with reference to FIGS. 4-7. The control module 22, based on the type of load 66, generates the I/O control signals 28 as previously described.

Figure 4:
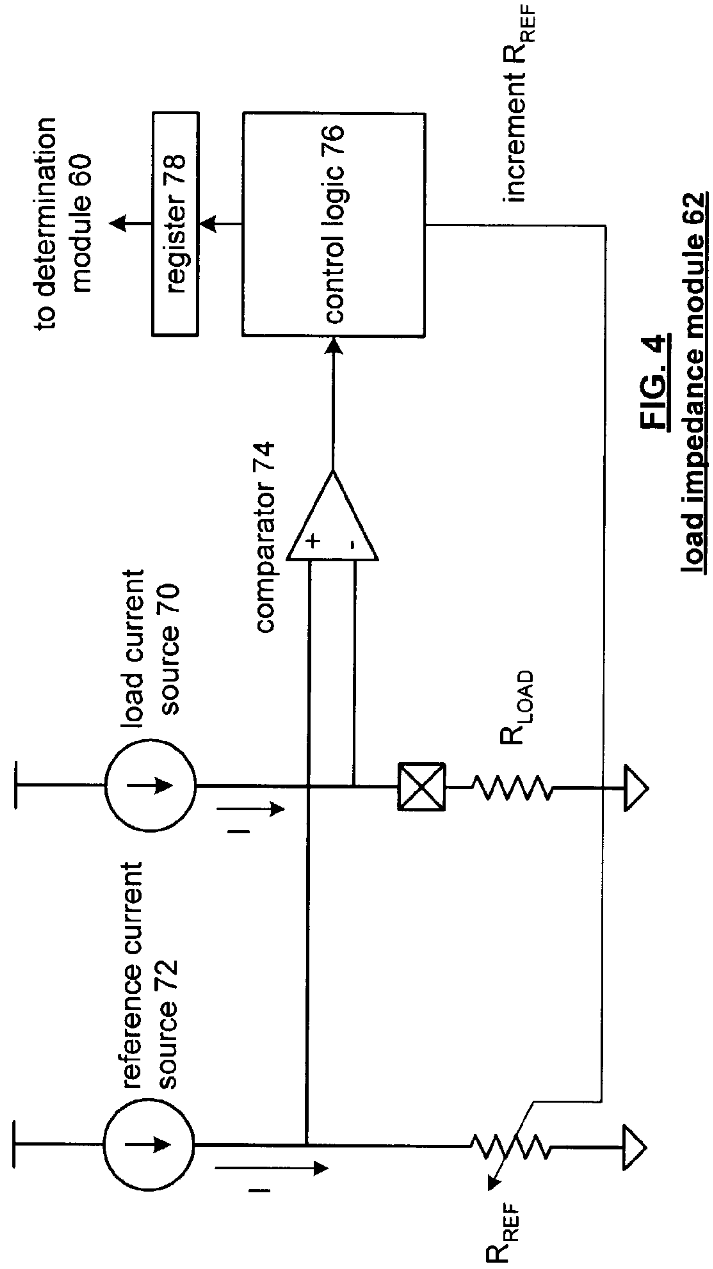
FIG. 4 is a schematic block diagram of a load impedance module in accordance with the present invention.

FIG. 4 is a schematic block diagram of one embodiment of the load impedance module 62. The load impedance module 62 includes a load current source 70, a reference current source 72, a variable reference impedance ($R_{ref}$), a comparator 74, control logic 76, and a register 78. The load current source 70 and reference current source 72 may provide a matched current to the load and variable reference impedance, respectively, or the reference current source 72 may be proportional to the load current 70. If the reference current source 72 is proportional to the load current 70, the variable impedance ($R_{ref}$) is increased proportionally with respect to the load of the pin.

In operation, the load current source 70 provides a current to the load on the pin ($R_{load}$). As such, a voltage is imposed across the load. The reference current source 72 also provides a current to the variable impedance ($R_{ref}$), which is initially set to its lowest value. Accordingly, a voltage is imposed across the reference impedance. The comparator 74 compares the voltage imposed across the load and across the reference impedance. If the voltage across the reference impedance is less than the voltage across the load, the control logic 76 increments the variable impedance and the comparison is done again. The control logic 76 continues to increment the reference impedance until the voltage imposed across the reference impedance exceeds the voltage imposed across the load.

When the voltage across the reference impedance exceeds the voltage across the load, the control logic 76 generates a corresponding digital value indicating the impedance. The digital load impedance is stored in register 78, or some other memory device, and subsequently provided to the determination module 60.

Figure 5:
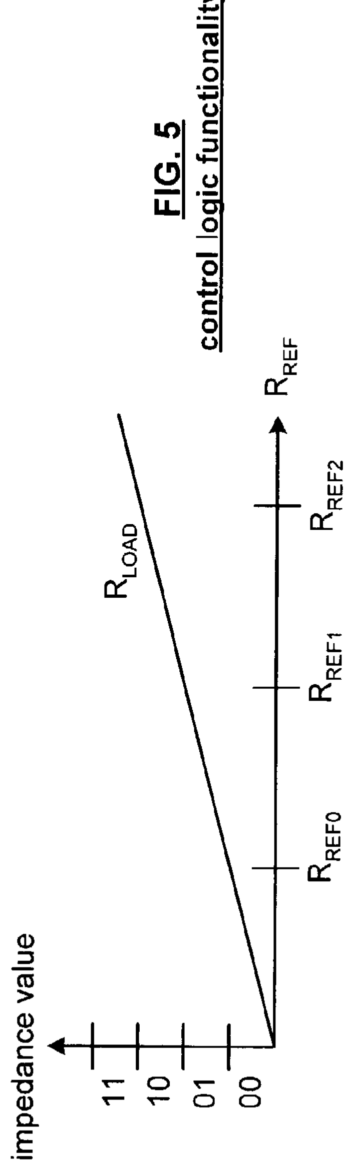
FIG. 5 is a graph depicting the control logic functionality of the control logic of a load impedance module.

FIG. 5 is a graph illustrating the general functionality of the control logic 76. The initial variable impedance setting is depicted as $R_{ref0}$. If, when the variable impedance is set at $R_{ref0}$ and the load impedance is less than $R_{ref0}$, the control logic 76 generates an impedance value having a digital value of 00. If, the load impedance falls between the initial variable impedance setting ($R_{ref0}$) and the $2^{nd}$ setting of the variable impedance ($R_{ref1}$), the control logic 76 generates a digital impedance value of 01. If the load impedance falls between the $2^{nd}$ and $3^{rd}$ reference impedances ($R_{ref1}$ and $R_{ref2}$), the control logic 76 generates a digital value of 10. If the impedance of the load is greater than the $3^{rd}$ impedance reference value ($R_{ref2}$), the control logic 76 generates a digital value of 11.

The determination module 60, which may use a look-up table, interprets the digital impedance value to identify the particular type of device. For example, a microphone may have an impedance value in the range of 1-2 kilo-OHMS, headphones may have an impedance value between 16 OHMS and 60 OHMS and speakers may have an impedance value between 4 and 16 OHMS. As one of average skill in the art will appreciate, the steps of the variable impedance may be more than the four illustrated in FIG. 5 to provide greater granularity in determining the impedance of the load.

Figure 6:
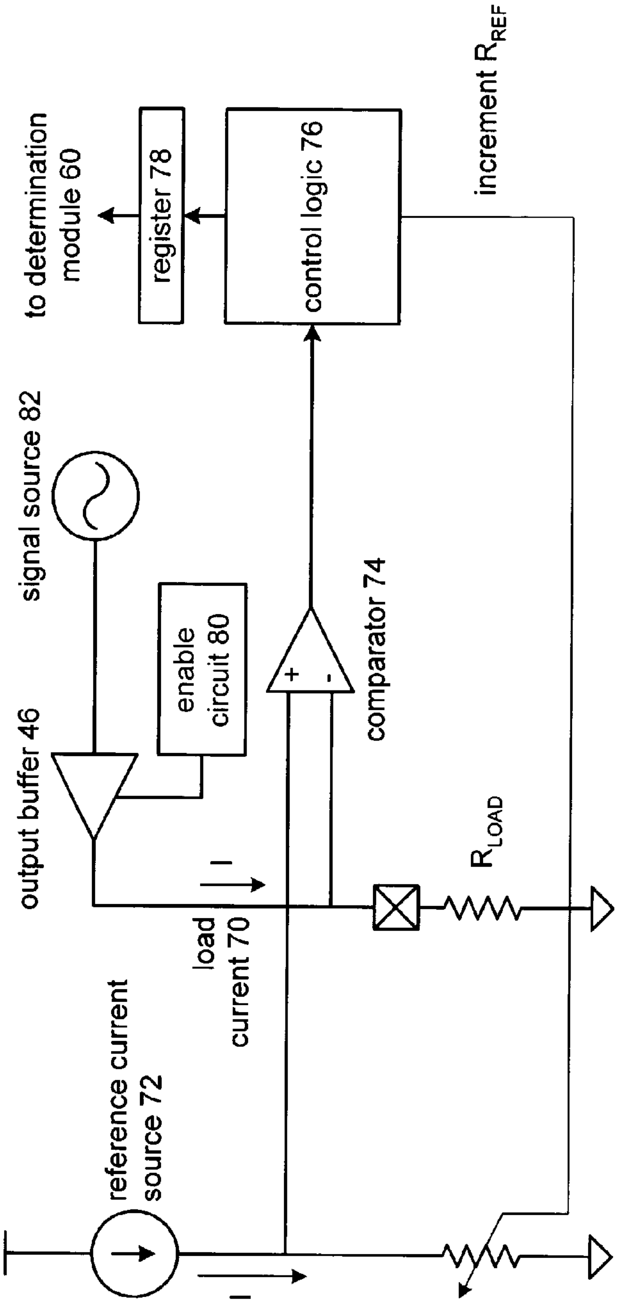
FIG. 6 is a schematic block diagram of an alternate load impedance module in accordance with the present invention.

FIG. 6 is a schematic block diagram of an alternate embodiment of a load impedance module 62. In this embodiment, the load impedance module 62 includes the reference current source 72, comparator 74, control logic 76, register 78, an enable circuit 80 and a signal source 82. The enable circuit 80 is operably coupled to enable an output buffer 46 of the I/O module to provide the load current 70 based on the signal source 82. The load current 70 may be in proportion to the reference current produced by the reference current source 72, which may be a matched buffer to that of the output buffer 46. When the reference current source 72 is implemented as a matched buffer, it receives the signal produced by the signal source 82 to generate the reference current. The signal source 82 may be a DC signal source, or a variable signal source. For a variable signal source, the frequency may be varied to further fine-tune the impedance of the load. Accordingly, the impedance of the load may be frequency dependent. Based on this frequency dependency, a more accurate interpretation of the particular device coupled to the pin may be rendered.

With the output buffer generating the load current source 70, the load impedance module 62 functions similarly to the load impedance module of FIG. 4. Note that multiple output buffers, with different drive strengths may be used to supply the load current 70. As the output buffer 46 is changed, the variable impedance scale is accordingly changed. For example, the variable impedance scale is lower if the output driver 46 is capable of driving speakers or headphones. Conversely, if the output buffer 46 is designed to source a line-out, which is significantly less output power than headphones or speakers, the variable impedance scale would be adjusted accordingly.

Figure 7:
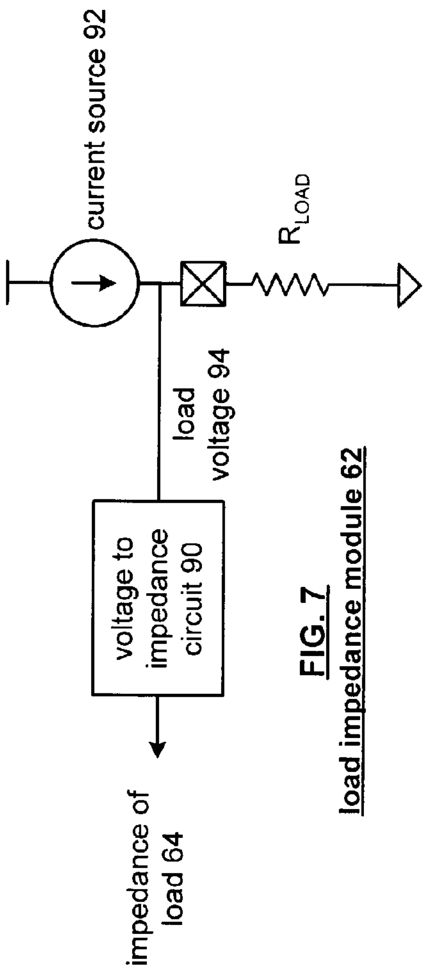
FIG. 7 is a schematic block diagram of another embodiment of a load impedance module in accordance with the present invention.

FIG. 7 is a schematic block diagram of another embodiment of a load impedance module 62. In this embodiment, the load impedance module 62 includes a current source 92 and a voltage-to-impedance circuit 90. The current source 92 generates the current that imposes a load voltage 94 across the load coupled to the pin. The voltage-to-impedance circuit 90 interprets the load voltage in view of the current provided by current source 92 to identify the impedance of the load 64.

Figure 8:
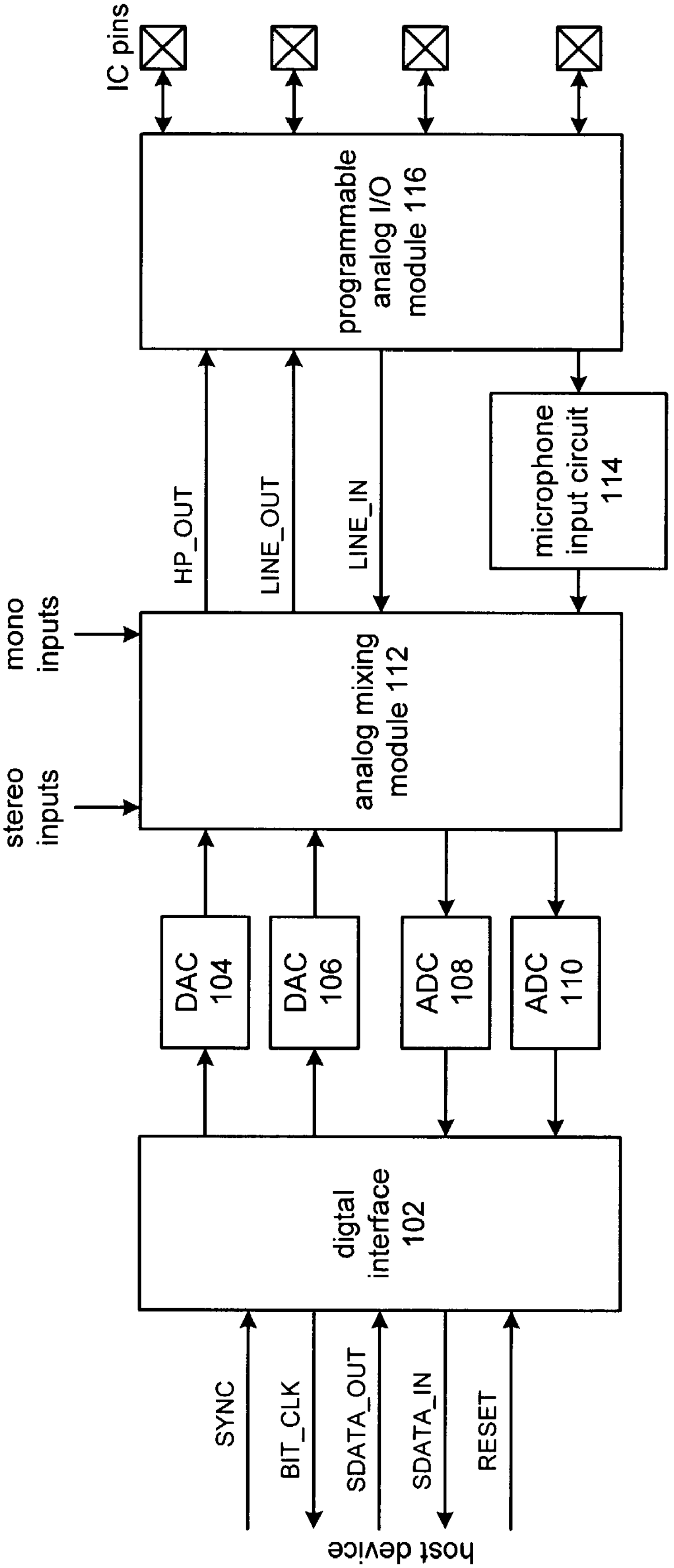
FIG. 8 is a schematic block diagram of an audio codec integrated circuit in accordance with the present invention.

FIG. 8 is a schematic block diagram of an audio codec integrated circuit 100 that includes a digital interface 102, a plurality of digital-to-analog converters 104-106, a plurality of analog-to-digital converters 108-110, an analog mixing module 112, a programmable analog I/O module 116 and a microphone input circuit 114. The digital interface 102, digital-to-analog converters 104-106, analog-to-digital converters 108-110, the analog mixing module 112 and the microphone input circuit 114 function as is known in the art. Thus, no further discussion regarding their functionality will be provided except to further illustrate the concepts of the present invention.

Figure 9:
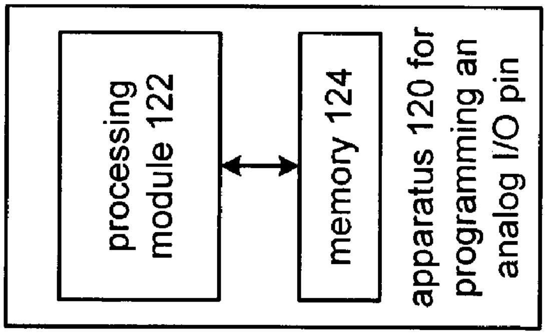
FIG. 9 is a schematic block diagram of an apparatus for programming an analog input/output pin in accordance with the present invention.
Figure 10:
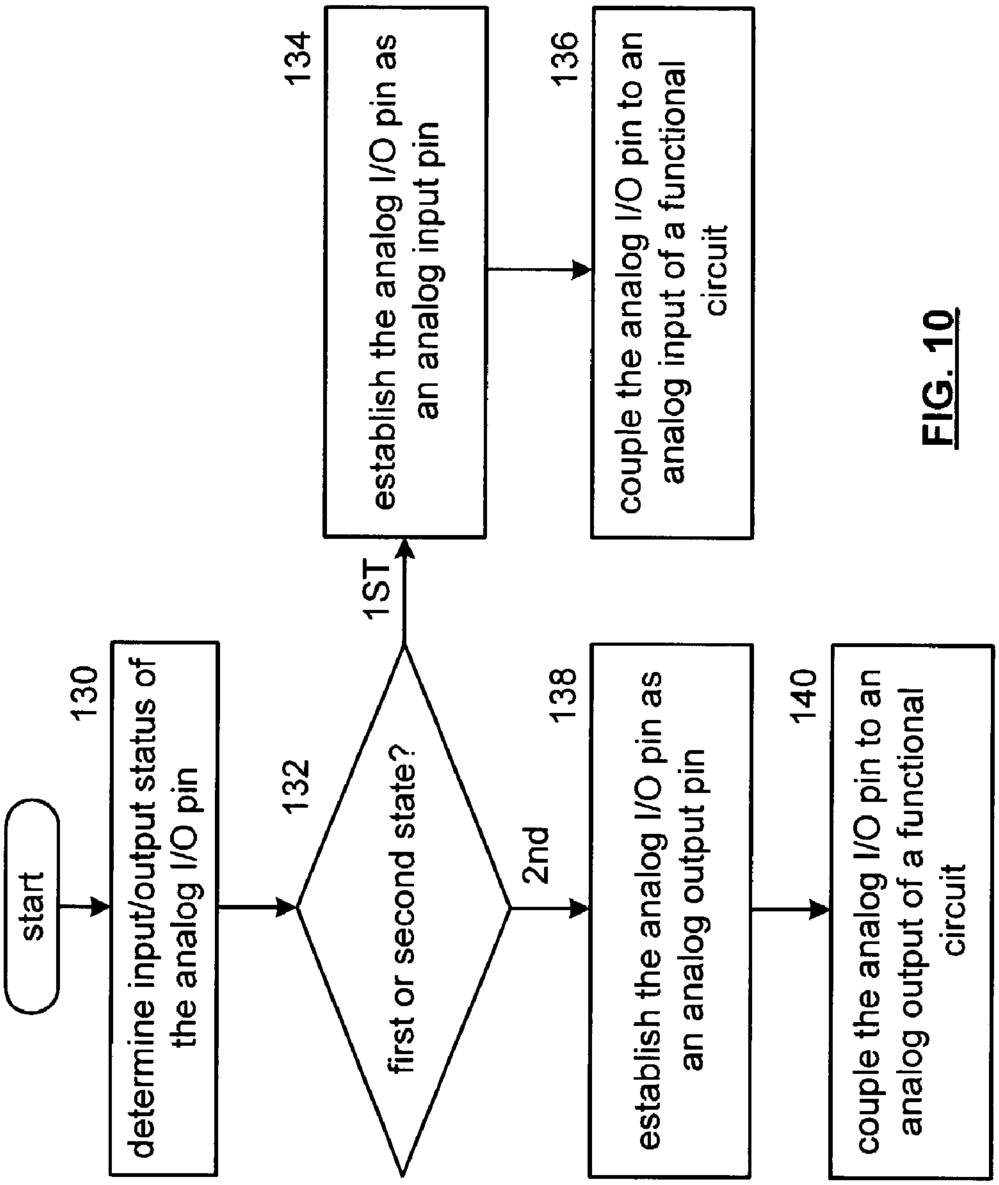
FIG. 10 is a logic diagram of a method for programming an analog input/output pin in accordance with the present invention.

The programmable analog I/O module 116 is operably coupled between the integrated circuit pins and the analog mixing module 112 and microphone input circuit 114. The programmable analog I/O module 116 may be implemented as previously described with reference to FIGS. 1-7 or as illustrated in FIGS. 9 and 10. In general, the programmable analog I/O module 116 allows for the audio codec IC 100 to provide flexibility to manufacturers utilizing such an audio codec by configuring the integrated circuit pins in any desired manner. In addition, the programmable analog I/O module 116 allows for incorrect connection of analog input/output devices to the audio codec and provide automatic reconfiguring of the analog I/O module to provide the appropriate analog input sources to the appropriate analog input lines of the audio codec and the appropriate analog output lines to the appropriate analog output devices. For example, if a headphone is plugged into the top integrated circuit pin, the programmable analog I/O module 16 would couple the headphone output (HP_OUT) from the analog mixing module 112 to that particular pin. If the $2^{nd}$ pin has a microphone coupled to it, the programmable analog I/O module 16 would couple the $2^{nd}$ pin to the microphone input circuit 114. Similar connections would be provided for the line-out and line-in connections of the analog mixing module 112.

FIG. 9 is a schematic block diagram of an apparatus 120 for programming an analog input/output pin of an integrated circuit. The apparatus 120 includes a processing module 122 and memory 124. The processing module 122 may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 124 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 122 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 124 stores, and the processing module 122 executes, operational instructions corresponding to at least some of the steps and/or functions illustrated in FIG. 10.

FIG. 10 is a logic diagram of a method for programming an analog input/output pin of an integrated circuit. The method begins at Step 130 where input/output status of the analog input/output pin is determined. The input/output status may be determined by determining an impedance of a load coupled to the analog I/O pin. Having determined the impedance, a type of load is determined therefrom.

The process then proceeds to Step 132 where determination is made as to whether the input/output status is in a $1^{st}$ state or in a $2^{nd}$ state. For example, the $1^{st}$ state may correspond to an impedance that indicates that an analog input device is coupled to the pin while the $2^{nd}$ state indicates that an analog output device is coupled to the pin. If the input/output status is in the $1^{st}$ state, the process proceeds to Step 134 where the analog I/O pin is established as an analog input pin. The process then proceeds to Step 136 where the analog I/O pin is coupled to an analog input of a functional circuit.

If the input/output status corresponds to the $2^{nd}$ state, the process proceeds to Step 138 where the analog I/O pin is established as an analog output pin. The process then proceeds to Step 140 where the analog I/O pin is coupled to an analog output of a functional circuit.

The preceding discussion has presented a programmable analog I/O integrated circuit system that allows for flexibility in configuring integrated circuits and allows for automatic correction of incorrect hook-ups of analog devices to an integrated circuit. As one of average skill in the art will appreciate, other embodiments may be derived from the teaching of the present invention, without deviating from the scope of the claims.

What is claimed is:

1. A programmable analog input/output (I/O) integrated circuit (IC) system comprises:

a plurality of IC pins:

an analog I/O circuit operably coupled to the plurality of pins, wherein the analog I/O circuit determines input/output status of each of the plurality of IC pins, wherein the analog I/O circuit includes:

a plurality of I/O modules operably coupled to and corresponding to the plurality of IC pins, wherein an I/O module of the plurality of I/O modules includes at one of:

an input buffer operably coupled to a corresponding one of the plurality of IC pins, wherein, when the I/O control signal is in a first state, the input buffer is active;

a tri-state output buffer operably coupled to the corresponding one of the plurality of IC pins, wherein, when the I/O control signal is in a second state, the tri-state output buffer is active; and sensing module operably coupled to the corresponding one of the plurality of IC pins, wherein the sensing module senses the I/O status of the corresponding one of the plurality of IC pins, wherein the sensing module includes:

load impedance module operably coupled to determine impedance of a load coupled to the corresponding one of the plurality of IC pins, wherein the load impedance module includes:

load current source operably coupled to source a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference impedance; and determination module operably coupled to determine a type of load coupled to the corresponding one of the plurality of IC pins based on the impedance of the load;

control module operably coupled to the analog I/O circuit to provide an I/O control signal to the analog I/O circuit based on the I/O status of each of the plurality of IC pins and to provide a switching control signal for configuring the programmable analog I/O IC system; and switching module operably coupled to the analog I/O circuit based on the switching control signal.

2. The programmable analog I/O IC system of claim 1, wherein the control module further functions to:

interpret the type of load to generate the I/O control signal and the switching control signal.

3. The programmable analog I/O IC system of claim 2, wherein the type of load further comprises at least one of:

a microphone;

a headphone, speakers;

line input jack; and line output jack.

4. The programmable analog I/O IC system of claim 1, wherein the switching module further comprises:

a plurality of multiplexers operably coupled to the analog I/O module, wherein the plurality of multiplexers are configured based on the switching control signal.

5. The programmable analog I/O IC system of claim 1, wherein the analog I/O circuit further comprises:

a frequency variable source such that the analog I/O circuit determines a frequency dependent impedance of a load as the input/output status of each of the plurality of IC pins.

6. A programmable analog input/output (I/O) integrated circuit (IC) system comprises:

a plurality of IC pins:

an analog I/O circuit operably coupled to the plurality of pins, wherein the analog I/O circuit determines input/output status of each of the plurality of IC pins, wherein the analog I/O circuit includes:

a plurality of I/O modules operably coupled to and corresponding to the plurality of IC pins, wherein an I/O module of the plurality of I/O modules includes at one of:

an input buffer operably coupled to a corresponding one of the plurality of IC pins, wherein, when the I/O control signal is in a first state, the input buffer is active;

a tri-state output buffer operably coupled to the corresponding one of the plurality of IC pins, wherein, when the I/O control signal is in a second state, the tri-state output buffer is active; and sensing module operably coupled to the corresponding one of the plurality of IC pins, wherein the sensing module senses the I/O status of the corresponding one of the plurality of IC pins, wherein the sensing module includes:

load impedance module operably coupled to determine impedance of a load coupled to the corresponding one of the plurality of IC pins, wherein the load impedance module includes:

enable circuit operably coupled to enable the at least one tri-state output buffer to provide a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference; and determination module operably coupled to determine a type of load coupled to the corresponding one of the plurality of IC pins based on the impedance of the load;

control module operably coupled to the analog I/O circuit to provide an I/O control signal to the analog I/O circuit based on the I/O status of each of the plurality of IC pins and to provide a switching control signal for configuring the programmable analog I/O IC system; and switching module operably coupled to the analog I/O circuit based on the switching control signal.

7. A programmable analog input/output (I/O) pin comprises:

an integrated circuit (IC) pin;

an analog I/O circuit operably coupled to the pin, wherein the analog I/O circuit determines input/output status of the pin, wherein the analog I/O circuit includes:

an input buffer operably coupled to the pin, wherein, when the I/O control signal is in a first state, the input buffer is active;

a tri-state output buffer operably coupled to the pin, wherein, when the I/O control signal is in a second state, the tri-state output buffer is active; and sensing module operably coupled to the pin, wherein the sensing module senses the I/O status of the pin, wherein the sensing module includes:

load impedance module operably coupled to determine impedance of a load coupled to the pin, wherein the load impedance module includes:

load current source operably coupled to source a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference impedance; and determination module operably coupled to determine a type of load coupled to the pin based on the impedance of the load;

control module operably coupled to generate an I/O control signal and a switching control signal based on the I/O status of each of the plurality of IC pin, wherein the control module provides the I/O control signal to the analog I/O circuit; and switching module operably coupled to the analog I/O circuit based on the switching control signal.

8. The programmable analog I/O pin of claim 7, wherein the control module further functions to:

interpret the type of load to generate the I/O control signal and the switching control signal.

9. The programmable analog I/O pin of claim 7, wherein the switching module further comprises:

a plurality of multiplexers operably coupled to the analog I/O module, wherein the plurality of multiplexers are configured based on the switching control signal.

10. The programmable analog I/O pin of claim 7, wherein the analog I/O circuit further comprises:

a frequency variable source such that the analog I/O circuit determines a frequency dependent impedance of a load as the input/output status of each of the plurality of IC pins.

11. A programmable analog input/output (I/O) pin comprises:

an integrated circuit (IC) pin;

an analog I/O circuit operably coupled to the pin, wherein the analog I/O circuit determines input/output status of the pin, wherein the analog I/O circuit includes:

an input buffer operably coupled to the pin, wherein, when the I/O control signal is in a first state, the input buffer is active;

a tri-state output buffer operably coupled to the pin, wherein, when the I/O control signal is in a second state, the tri-state output buffer is active; and sensing module operably coupled to the pin, wherein the sensing module senses the I/O status of the pin, wherein the sensing module includes:

load impedance module operably coupled to determine impedance of a load coupled to the pin, wherein the load impedance module includes:

enable circuit operably coupled to enable the at least one tri-state output buffer to provide a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference impedance; and determination module operably coupled to determine a type of load coupled to the pin based on the impedance of the load;

control module operably coupled to generate an I/O control signal and a switching control signal based on the I/O status of each of the plurality of IC pin, wherein the control module provides the I/O control signal to the analog I/O circuit; and switching module operably coupled to the analog I/O circuit based on the switching control signal.

12. An audio codec integrated circuit (IC) comprises:

digital interface operably coupled to transceive digitized audio data with a host device;

at least one digital to analog converter (DAC) operably coupled to convert outbound digital signals received via the digital interface into outbound analog signals;

at least one analog to digital converter (ADC) operably coupled to convert inbound analog signals into inbound digital signals, wherein the at least one ADC provides the inbound digital signals to the digital interface;

microphone input circuit operably coupled to process a microphones input signal;

analog mixing module operably coupled to mix up to a plurality of analog signals to produce a mixed analog signal; and programmable analog input/output (I/O) module operably coupled to the microphone input circuit and to the analog mixing module, wherein the programmable analog I/O module includes:

a plurality of IC pins:

an analog I/O circuit operably coupled to the plurality of pins, wherein the analog I/O circuit determines input/output status of each of the plurality of IC pins, wherein the analog I/O circuit includes:

a plurality of I/O modules operably coupled to and corresponding to the plurality of IC pins, wherein an I/O module of the plurality of I/O modules includes at least one of:

an input buffer operably coupled to a corresponding one of the plurality of IC pins, wherein, when the I/O control signal is in a first state, the input buffer is active;

a tri-state output buffer operably coupled to the corresponding one of the plurality of IC pins, wherein, when the I/O control signal is in a second state, the tri-state output buffer is active; and sensing module operably coupled to the corresponding one of the plurality of IC pins, wherein the sensing module senses the I/O status of the corresponding one of the plurality of IC pins, wherein the sensing module includes:

load impedance module operably coupled to determine impedance of a load coupled to the corresponding one of the plurality of IC pins, wherein the load impedance module includes:

load current source operably coupled to source a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference impedance; and determination module operably coupled to determine a type of load coupled to the corresponding one of the plurality of IC pins based on the impedance of the load;

control module operably coupled to the analog I/O circuit to provide an I/O control signal to the analog I/O circuit based on the I/O status of each of the plurality of IC pins and to provide a switching control signal for configuring the programmable analog I/O IC system; and switching module operably coupled to the analog I/O circuit based on the switching control signal.

13. The audio codec IC of claim 12, wherein the control module further functions to:

interpret the type of load to generate the I/O control signal and the switching control signal.

14. The audio codec IC of claim 13, wherein the type of load further comprises at least one of:

a microphone;

a headphone, speakers;

line input jack; and line output jack.

15. The audio codec IC of claim 12, wherein the switching module further comprises:

a plurality of multiplexers operably coupled to the analog I/O module, wherein the plurality of multiplexers are configured based on the switching control signal.

16. The audio codec IC of claim 12, wherein the analog I/O circuit further comprises:

a frequency variable source such that the analog I/O circuit determines a frequency dependent impedance of a load as the input/output status of each of the plurality of IC pins.

17. An audio codec integrated circuit (IC) comprises:

digital interface operably coupled to transceive digitized audio data with a host device;

at least one digital to analog converter (DAC) operably coupled to convert outbound digital signals received via the digital interface into outbound analog signals;

at least one analog to digital converter (ADC) operably coupled to convert inbound analog signals into inbound digital signals, wherein the at least one ADC provides the inbound digital signals to the digital interface;

microphone input circuit operably coupled to process a microphones input signal;

analog mixing module operably coupled to mix up to a plurality of analog signals to produce a mixed analog signal; and programmable analog input/output (I/O) module operably coupled to the microphone input circuit and to the analog mixing module, wherein the programmable analog I/O module includes:

a plurality of IC pins:

an analog I/O circuit operably coupled to the plurality of pins, wherein the analog I/O circuit determines input/output status of each of the plurality of IC pins, wherein the analog I/O circuit includes:

a plurality of I/O modules operably coupled to and corresponding to the plurality of IC pins, wherein an I/O module of the plurality of I/O modules includes at least one of:

an input buffer operably coupled to a corresponding one of the plurality of IC pins, wherein, when the I/O control signal is in a first state, the input buffer is active;

a tri-state output buffer operably coupled to the corresponding one of the plurality of IC pins, wherein, when the I/O control signal is in a second state, the tri-state output buffer is active; and sensing module operably coupled to the corresponding one of the plurality of IC pins, wherein the sensing module senses the I/O status of the corresponding one of the plurality of IC pins, wherein the sensing module includes:

load impedance module operably coupled to determine impedance of a load coupled to the corresponding one of the plurality of IC pins, wherein the load impedance module includes:

enable circuit operably coupled to enable the at least one tri-state output buffer to provide a current to the load to produce a load voltage;

reference current source operably coupled to source a controlled current to a reference impedance to produce a reference voltage;

comparator operably coupled to compare the reference voltage to the load voltage; and control logic operably coupled to interpret an output of the comparator, wherein, when the output of the comparator is in a first state, the control logic adjusts the reference impedance to produce a second reference voltage, and when the output of the comparator is in a second state, the control logic enables storing the impedance of the load based on the reference impedance; and determination module operably coupled to determine a type of load coupled to the corresponding one of the plurality of IC pins based on the impedance of the load;

control module operably coupled to the analog I/O circuit to provide an I/O control signal to the analog I/O circuit based on the I/O status of each of the plurality of IC pins and to provide a switching control signal for configuring the programmable analog I/O IC system; and switching module operably coupled to the analog I/O circuit based on the switching control signal.

18. A method for programming an analog input/output (I/O) pin, the method comprises:

determining input/output status of the analog I/O pin, wherein the determining includes:

determining impedance of a load coupled to the analog I/O pin, wherein the determining the impedance of the load includes:

sourcing a current to the load to produce a load voltage;

sourcing a controlled current to a reference impedance to produce a reference voltage;

comparing the reference voltage to the load voltage;

interpreting the comparing to, when the comparing is in a first state, adjusting the reference impedance to produce a second reference voltage; and storing the impedance of the load based on the reference impedance when the comparing is in a second state; and determining a type of load coupled to the analog I/O pin based on the impedance of the load;

establishing the analog I/O pin as an analog input pin when the input/output status is in a first state;

establishing the analog I/O pin as an analog output pin when the input/output status is in a second state;

coupling the analog I/O pin to an analog input of a functional circuit when the input/output status is in the first state; and coupling the analog I/O pin to an analog output of a functional circuit when the input/output status is in the second state.

19. The method of claim 18, wherein the type of load further comprises at least one of:

a microphone;

a headphone, speakers;

line input jack; and line output jack.

20. The method of claim 18, wherein the determining input/output status of the analog I/O pin further comprises:

determining a frequency dependent impedance of a load as the input/output status of each of the plurality of IC pins.

21. A method for programming an analog input/output (I/O) pin, the method comprises:

determining input/output status of the analog I/O pin, wherein the determining includes:

determining impedance of a load coupled to the analog I/O pin, wherein the determining the impedance of the load includes:

enabling a tri-state output buffer to provide a current to the load to produce a load voltage;

sourcing a controlled current to a reference impedance to produce a reference voltage;

comparing the reference voltage to the load voltage;

interpreting the comparing to, when the comparing is in a first state, adjusting the reference impedance to produce a second reference voltage; and storing the impedance of the load based on the reference impedance when the comparing is in a second state; and determining a type of load coupled to the analog I/O pin based on the impedance of the load;

establishing the analog I/O pin as an analog input pin when the input/output status is in a first state;

establishing the analog I/O pin as an analog output pin when the input/output status is in a second state;

coupling the analog I/O pin to an analog input of a functional circuit when the input/output status is in the first state; and coupling the analog I/O pin to an analog output of a functional circuit when the input/output status is in the second state.

22. An apparatus for programming an analog input/output (I/O) pin, the apparatus comprises:

processing module; and memory operably coupled to the processing module, wherein the memory includes operational instructions that cause the processing module to:

determine input/output status of the analog I/O pin, which includes:

determining impedance of a load coupled to the analog I/O pin, which includes:

sourcing a current to the load to produce a load voltage;

sourcing a controlled current to a reference impedance to produce a reference voltage;

comparing the reference voltage to the load voltage;

interpreting the comparing to, when the comparing is in a first state, adjusting the reference impedance to produce a second reference voltage; and storing the impedance of the load based on the reference impedance when the comparing is in a second state; and determining a type of load coupled to the analog I/O pin based on the impedance of the load;

establish the analog I/O pin as an analog input pin when the input/output status is in a first state;

establish the analog I/O pin as an analog output pin when the input/output status is in a second state;

couple the analog I/O pin to an analog input of a functional circuit when the input/output status is in the first state; and couple the analog I/O pin to an analog output of a functional circuit when the input/output status is in the second state.

23. The apparatus of claim 22, wherein the type of load further comprises at least one of:

a microphone;

a headphone, speakers;

line input jack; and line output jack.

24. The apparatus of claim 22, wherein the memory further comprises operational instructions that cause the processing module to determine the input/output status by:

determining a frequency dependent impedance of a load as the input/output status of each of the plurality of IC pins.

25. An apparatus for programming an analog input/output (I/O) pin, the apparatus comprises:

processing module; and memory operably coupled to the processing module, wherein the memory includes operational instructions that cause the processing module to:

determine input/output status of the analog I/O pin, which includes:

determining impedance of a load coupled to the analog I/O pin, which includes:

enabling a tri-state output buffer to provide a current to the load to produce a load voltage;

sourcing a controlled current to a reference impedance to produce a reference voltage;

comparing the reference voltage to the load voltage;

interpreting the comparing to, when the comparing is in a first state, adjusting the reference impedance to produce a second reference voltage; and storing the impedance of the load based on the reference impedance when the comparing is in a second state; and determining a type of load coupled to the analog I/O pin based on the impedance of the load;

establish the analog I/O pin as an analog input pin when the input/output status is in a first state;

establish the analog I/O pin as an analog output pin when the input/output status is in a second state;

couple the analog I/O pin to an analog input of a functional circuit when the input/output status is in the first state; and couple the analog I/O pin to an analog output of a functional circuit when the input/output status is in the second state.

* * * * *